Nov. 20, 1962
A. DEL DUCA ETAL
3,065,364
MEMORY STORAGE TREND RECORDER
Filed Feb. 19, 1960
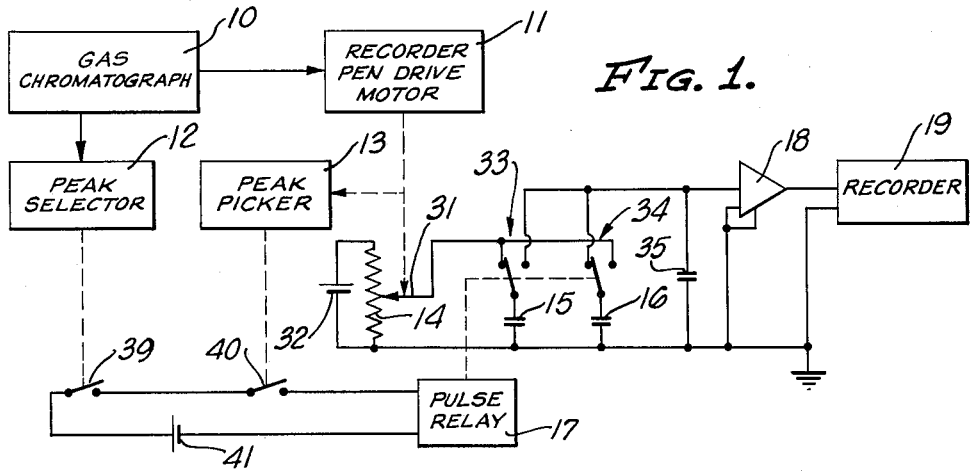
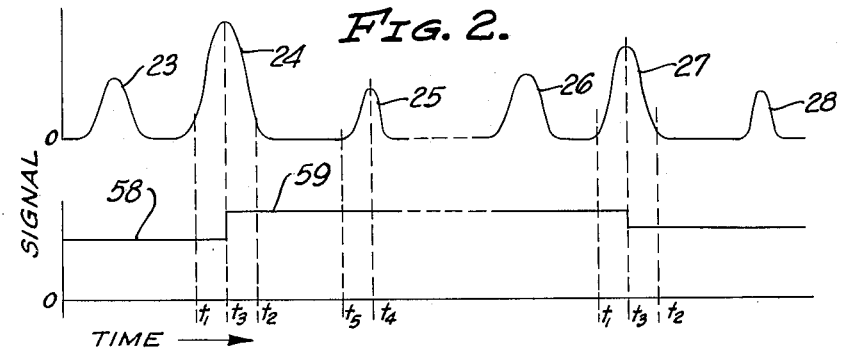
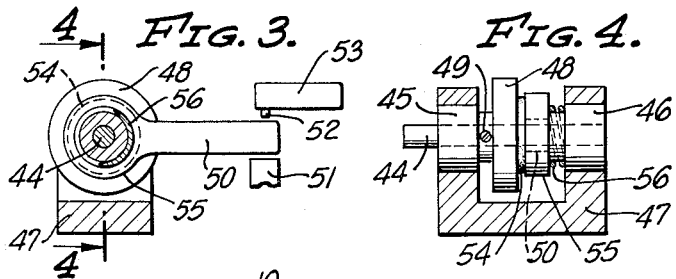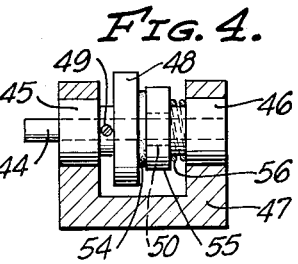
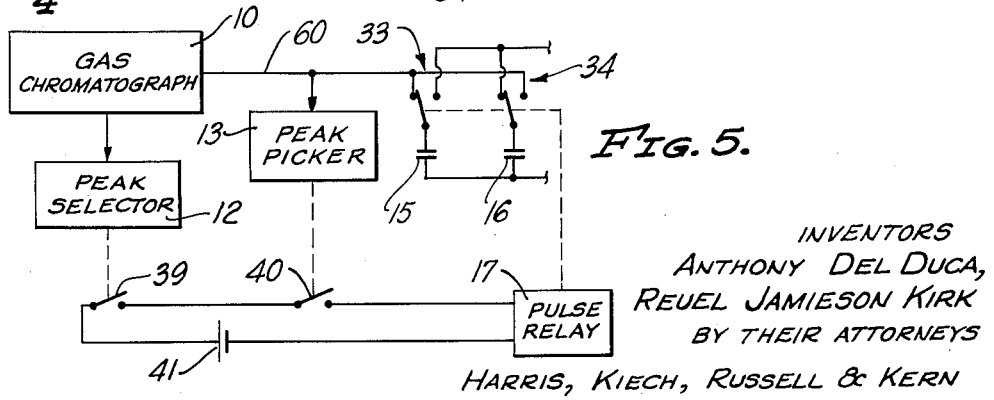
INVENTORS
ANTHONY DEL DUCA,
REUEL JAMIESON KIRK
BY THEIR ATTORNEYS
HARRIS, KIECH, RUSSELL & KERN "# United States Patent Office 3,065,364
Patented Nov. 20, 1962

3,065,364
MEMORY STORAGE TREND RECORDER
Anthony Del Duca, Garden Grove, and Reuel Jamieson Kirk, Brea, Calif., assignors to Beckman Instruments, Inc., a corporation of California
Filed Feb. 19, 1960, Ser. No. 9,864
5 Claims. (Cl. 307—106)

This invention relates to analyzers such as gas chromatographs and the like, and in particular, to a trend recorder for use with an analyzer.

A gas chromatograph produces an output in the form of a train of signal peaks for each sample introduced into the instrument, with the time of occurrence of a peak identifying the particular component of the sample which produces the peak and with the magnitude of the peak constituting a measure of the quantity of the particular component present in the sample.

In process monitoring, a sample will be introduced into the analyzer periodically resulting in an output in the form of a cyclical train of signal peaks, with the change in maximum value of a particular peak in each successive train indicating the trend of a particular constituent of the sample being analyzed. The output of the conventional analyzer will be a chart having many peaks thereon and trend recorders have been developed which produce a record indicating only the change in maximum value of a particular peak or peaks of the train.

It is an object of the present invention to provide a new and improved trend recorder for use with analyzers that produce an output in the form of a cyclical train of signal peaks. A further object is to produce such an instrument that is simple and inexpensive to manufacture and maintain and one that is highly reliable in operation.

It is an object of the invention to provide a trend recorder wherein a voltage representing the maximum value of a particular signal peak is transferred to a capacitor which, in turn, is connected as an input to a recorder or other output device for maintaining the signal level of the recorder constant until the particular signal peak occurs in the next sample cycle. A further object is to provide such an instrument wherein two capacitors are synchronously switched between the voltage source and the output circuit so that one capacitor is being charged from the source while the other is providing a signal for the output circuit. A further object is to provide a control circuit for switching the capacitors with the control circuit actuating the capacitor switching means only when a particular signal peak reaches its maximum value.

It is an object of the invention to provide a trend recorder of the type discussed above which can be used with conventional peak selectors or timing units and with conventional peak pickers or slope change detectors.

Further objects and advantages of the invention will more fully appear in the course of the following description. The drawing merely shows and the description merely describes preferred embodiments of the present invention which are given by way of illustration or example.

In the drawing:

FIG. 1 is a block diagram showing a preferred form of the invention;

FIG. 2 is a graph depicting the operation of the invention;

FIG. 3 is an elevation view of one form of peak picker for use with the invention;

FIG. 4 is a sectional view taken along the line 4—4 of FIG. 3; and

FIG. 5 is a block diagram of an alternative form of the invention.

The combination depicted in FIG. 1 includes a gas chromatograph 10, a chromatograph output recorder 11, a peak selector or timing unit 12, a peak picker or slope change detector 13, a potentiometer 14, voltage transfer capacitors 15 and 16, a relay 17, an amplifier 18 and another recorder 19.

The gas chromatograph 10, the recorder 11, the peak selector 12 and the peak picker 13 may be conventional in design such as is shown in the U.S. patent to Spracklen, No. 2,899,258, which patent is assigned to the same assignee as is the present application.

The upper curve of FIG. 2 represents a typical gas chromatograph output with a first train of three signal peaks 23, 24, 25 followed by a second train of corresponding peaks, 26, 27, 28. In a typical analysis, each peak may have a duration of about ten seconds and there may be an interval of ten minutes between initiation of one train and the next succeeding train. The peaks 23 and 26 are produced by the same constituent of the sample, as are the peaks 24, 27 and the peaks 25, 28. The purpose of the present invention is to provide a continuous record of the maximum value of a particular peak in each successive train. Such a record for the peaks 24, 27 is shown in the lower curve of FIG. 2.

In a conventional gas chromatograph, the output from the detector is in electrical form and is used to drive the pen of a recorder to produce the upper curve of FIG. 2. The recorder pen drive motor 11 may also drive an arm 31 of the potentiometer 14 to produce an electrical signal voltage for use in a trend recorder or other output device. In the embodiment shown herein, the potentiometer 14 is coupled across a D.C. voltage source 32 providing a D.C. signal at the arm 31 corresponding to the output of the gas chromatograph.

The relay 17 includes two sets of contacts 33, 34 with the capacitor 15 connected between the moving arm of the set 33 and circuit ground and the capacitor 16 connected between the moving arm of the set 34 and circuit ground. The arm 31 of the potentiometer 14 is directly connected to a first fixed contact of the set 33 and a second fixed contact of the set 34 while the second fixed contact of the set 33 and the first fixed contact of the set 34 are connected together to the output circuit consisting of the amplifier 18 and recorder 19. A capacitor 35 may be connected between the amplifier input and circuit ground to serve as a filter. The amplifier 18 preferably has an extremely high input impedance so that a charged capacitor connected thereto will maintain its charge over an extended period of time.

It should be noted that the electrical output of the detector of the gas chromatograph can serve as the voltage source for charging the capacitors 15, 16 and be directly connected to the contact sets 33, 34. However, it is preferred to isolate the transfer capacitors from the detector by providing a separate voltage source such as that shown in FIG. 1.

When the relay is in the position as shown in FIG. 1, the voltage on the capacitor 15 will correspond to the voltage at the arm 31 of the potentiometer 14 with the charge increasing as the value of a signal peak increases and with the charge decreasing as the value of a signal peak decreases. At the same time, the voltage on the capacitor 16 will remain substantially constant at the value attained at the time the relay was last actuated. A control circuit is provided for the relay to actuate the relay at the exact time that the particular peak of interest reaches its maximum value. A preferred form of control circuit for the relay is shown in FIG. 1.

The control circuit includes a normally open switch 39 and another normally open switch 40 connected in series between a power source 41 and the relay 17. The relay 17 is preferably of the pulse or ratchet type so that"

when energized at one time it will move from its first position to its second position and when again energized, it will move from its second position to its first position. The peak selector or timing units 12 will close the switch 39 at time $t_1$ and will open the switch at time $t_2$ thereby selecting the particular signal peak of interest. A typical peak selector may be the motor driven cam and switch of the aforesaid Spracklen patent with the cam adjusted to close the switch at $t_1$ and open the switch at $t_2$.

The peak picker or slope change detector 13 will close the switch 40 when the slope of a signal peak changes from positive to negative, which occurs at the time the signal peak is at a maximum as indicated at $t_3$ and $t_4$. When the output again changes slope, i.e., from negative to positive, the switch will be open, as at $t_5$. Hence, it is seen that the relay 17 is actuated only when there is coincidence between the closing of the switches 39 and 40, which occurs only when a predetermined peak of the train of peaks changes slope from positive to negative.

One form of peak picker mechanism is shown in FIGS. 3 and 4 wherein a shaft 44 driven by the pen drive motor 11 is journaled in bushings 45, 46 in a frame 47. A disc 48 is fixed to the shaft 44 for rotation therewith by means of a set screw 49. A hub 55 rotates freely on the shaft 44 and carries an arm 50 projecting radially therefrom. The end of the arm is positioned between a stop member 51 and the moving plunger 52 of a switch 53 which corresponds to the switch 40 of FIG. 1. A clutch plate 54 of suitable material such as cork or rubber is fixed to the hub 55 and is pressed against the disc 48 by a spring 56 so that rotation of the shaft 44 clockwise as seen in FIG. 3, moves the arm 50 against the stop 51. Conversely, rotation of the shaft counterclockwise moves the arm 50 against the plunger 52 and actuates the switch 53. The clearance between the arm 50 and the stop 51 and plunger 52 is made very small so that the switch is actuated at substantially the same time that the shaft changes direction, i.e., when the chromatograph output changes slope.

In the operation of the trend recorder of the invention, at a particular moment, the capacitor 16 will be connected as an input to the amplifier 18 producing an output at the recorder corresponding to the portion 58 of the lower curve of FIG. 2. As the peak 24 begins to appear in the output of the analyzer, the capacitor 15 will begin to be charged. At time $t_1$, the switch 39 will be closed by the peak selector. At time $t_3$, the switch 40 will be closed by the peak picker and the capacitor 15 will be transferred from the arm 31 of the potentiometer to the input of the amplifier 18 and the capacitor 16 will be disconnected from the amplifier input and connected to the potentiometer arm. The output of the recorder 19 will change to the level 59 corresponding to the maximum value of the peak 24. At time $t_2$, the switch 39 will open and at time $t_5$, the switch 40 will open. The switch 40 will again close at time $t_4$, however the relay 17 is not affected since the switch 39 is open. The circuit will remain in this condition until the peak 27 is reached at which time the cycle is repeated.

Since the interval between occurrences of the particular peak of interest may be in the order of ten minutes, it is necessary that the capacitance of the transfer capacitors 15 and 16 be large so that there is very little change in indicated output during the interval. The problem of providing the large charge necessary for the capacitors with high capacitance is met in the present circuit by having one capacitor connected to the signal peak during the entire interval that the signal peak is building up while the other capacitor is connected to the output circuit. This provides a marked improvement in operation and simplification in design over sampling type of circuits wherein the capacitor must be charged substantially instantaneously, calling for relatively small capacitance or very large power sources.

Most present day gas chromatographs includes a timing unit and a recorder so that the trend recorder of the present invention can be added to the analyzer with extreme ease. A peak picker or slope change detector such as that shown in FIGS. 3 and 4 and a potentiometer are added for driving by the recorder pen drive motor. The switching means such as the pulse relay, and the transfer capacitors may be added to the chromatograph or may be placed in a separate package with the output circuit such as the amplifier 18 and recorder 19. Of course, the entire combination can be built in a single package, if desired.

In FIG. 2, the chromatograph output (upper curve) and the trend recorder output (lower curve) are shown with the same time scale for comparison purposes. Since the elapsed time between changes in the trend is relatively long (as high as ten minutes), the time scale for the recorder 19 is usually compressed so that a complete trend record is obtained on a relatively short length of chart paper.

An alternative form of the invention utilizing an electrical slope change detector is shown in FIG. 5, wherein components identical to those of FIG. 1 are identified by the same reference numerals. In this embodiment, the peak picker 13 is an electrical circuit that senses the change in slope of the electrical output of the chromatograph appearing on line 60 and actuates the switch 40. As another variation in this embodiment, the line 60 from the chromatograph output is connected directly to the contact sets 33, 34.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a trend recorder or the like for operation with an analyzer that produces an electrical output in the form of a cyclical train of signal peaks, the combination of: an output circuit having a high impedance input; first and second voltage transfer capacitors; switch means having a first position for connecting said first capacitor to the analyzer output and said second capacitor to said output circuit as an input, and having a second position for connecting said second capacitor to the analyzer output and said first capacitor to said output circuit as an input; and a control circuit for switching said switch means from said first to said second position when the value of a predetermined peak of said train of peaks changes from positive slope to negative slope, and switching from said second position to said first position when in the next train of peaks the value of said predetermined peak again changes from positive slope to negative slope.

2. In a trend recorder or the like for operation with an analyzer that produces an electrical output in the form of a cyclical train of signal peaks, the combination of: an output circuit having a high impedance input; first and second voltage transfer capacitors; switch means having a first position for connecting said first capacitor to the analyzer output and said second capacitor to said output circuit as an input, and having a second position for connecting said second capacitor to the analyzer output and said first capacitor to said output circuit as an input; a peak selector circuit for generating a switch-actuating signal when a predetermined peak of said train of peaks appears at the analyzer output; a peak picker circuit for generating a switch-actuating signal when the value of a signal peak changes from positive slope to negative slope; and means for connecting said switch-actuating signals in series for actuating said switching means when there is coincidence in time of said signals to move said switching means from said first position to said second position and from said second position to said first position.

3. In a trend recorder or the like for operation with an analyzer that cyclically produces a train of signal peaks, the combination of: a variable voltage source providing an electrical output signal, said source including a moving arm for varying the magnitude of said signal; means for driving said arm in response to changes in the analyzer output; an output circuit having a high impedance input; first and second voltage transfer capacitors; switch means having a first position for connecting said first capacitor to said variable electrical signal and said second capacitor to said output circuit as an input, and having a second position for connecting said second capacitor to said variable electrical signal and said first capacitor to said output circuit as an input; and a control circuit for switching said switch means from said first position to said second position when the value of a predetermined peak of said train of peaks changes from positive slope to negative slope, and switching from said second position to said first position when in the next train of peaks the value of said predetermined peak again changes from positive slope to negative slope.

4. In a trend recorder or the like for operation with an analyzer that produces a shaft motion in the form of a cyclical train of signal peaks, the combination of: a variable voltage source; means for coupling the analyzer shaft motion to said variable voltage source in driving relationship; an output circuit having a high impedance input; first and second voltage transfer capacitors; a relay having a first position for connecting said first capacitor to said variable voltage source and said second capacitor to said output circuit as an input, and having a second position for connecting said second capacitor to said variable voltage and said first capacitor to said output circuit as an input; a power source for operating said relay; first and second switches connected in series between said power source and said relay; a timing unit operated in synchronism with the analyzer for closing said first switch when a predetermined peak of said train of peaks appears in the analyzer output; and a slope change-detecting unit driven by the analyzer output for closing said second switch when a signal peak changes slope from positive to negative.

5. In a trend recorder or the like for operation with an analyzer that produces an electrical output in the form of a cyclical train of signal peaks, the combination of: an output circuit having a high impedance input; first and second voltage transfer capacitors; a relay having a first position for connecting said first capacitor to the analyzer output and said second capacitor to said output circuit as an input, and having a second position for connecting said second capacitor to the analyzer output and said first capacitor to said output circuit as an input; a power source for operating said relay; first and second switches connected in series between said power source and said relay; a timing unit operated in synchronism with the analyzer for closing said first switch when a predetermined peak of said train appears in the analyzer output; and a slope change-detecting unit driven by the analyzer output for closing said second switch when a signal peak changes slope from positive to negative.

References Cited in the file of this patent
UNITED STATES PATENTS
2,963,647     Dean _____ Dec. 6, 1960